United States Patent [19]

Sekiguchi

[11] 4,087,563

[45] May 2, 1978

[54] METHOD FOR PROCESSING FISHES

[75] Inventor: Tadashi Sekiguchi, Shizuoka, Japan

[73] Assignee: Hotei Kanzume Co., Ltd., Japan

[21] Appl. No.: 698,303

[22] Filed: Jun. 21, 1976

[30] Foreign Application Priority Data

| Jun. 20, 1975 | Japan | 50-75021 |
|---|---|---|
| Jun. 20, 1975 | Japan | 50-75022 |
| Jun. 20, 1975 | Japan | 50-75023 |

[51] Int. Cl.$^2$ ............................................. A22C 25/00
[52] U.S. Cl. ........................................ 426/479; 17/46; 426/509; 426/510; 426/518
[58] Field of Search ............. 426/479, 506, 510, 509, 426/511, 523, 518, 520, 643, 480, 495; 17/56, 60, 46, 62, 19; 99/352, 355, 538

[56] References Cited

U.S. PATENT DOCUMENTS

| 2,234,658 | 3/1941 | Smith | 17/46 X |
|---|---|---|---|
| 2,411,736 | 11/1946 | Kleinschmidt | 426/643 |
| 2,750,623 | 6/1956 | Baader | 17/56 X |
| 2,787,549 | 4/1957 | Heald | 426/479 |
| 2,954,298 | 9/1960 | Anderson et al. | 426/479 X |
| 3,594,191 | 7/1971 | Lapeyre | 426/479 X |
| 3,741,772 | 6/1973 | McFarland | 426/518 X |
| 3,804,964 | 4/1974 | Hogstedt et al. | 17/56 X |
| 3,806,616 | 4/1974 | Mencacci et al. | 426/479 X |

*Primary Examiner*—S. Leon Bashore
*Assistant Examiner*—Kenneth M. Schor
*Attorney, Agent, or Firm*—Diller, Brown, Ramik & Wight

[57] ABSTRACT

A dressed body of a fish, which is obtained by cutting off the head part and removing the internal organs of the fish therefrom, is sliced into upper and lower fish fillets and a part mainly consisting of the vertebra thereof. The thus obtained upper and lower fish fillets are heated by means of very hot water, or steam or the like and then cooled forcibly by a coolant with the result that the connective tissues of the fish meats can be hardened in a short time, consumption of heat energy for hardening them is small, the quality deterioration thereof is little and high yield of product is obtained. The upper and lower fillets are heated on a plate with the fillet skins against the plate. The part containing the vertebra is heated, and white meat is later separated from bone.

6 Claims, 1 Drawing Figure

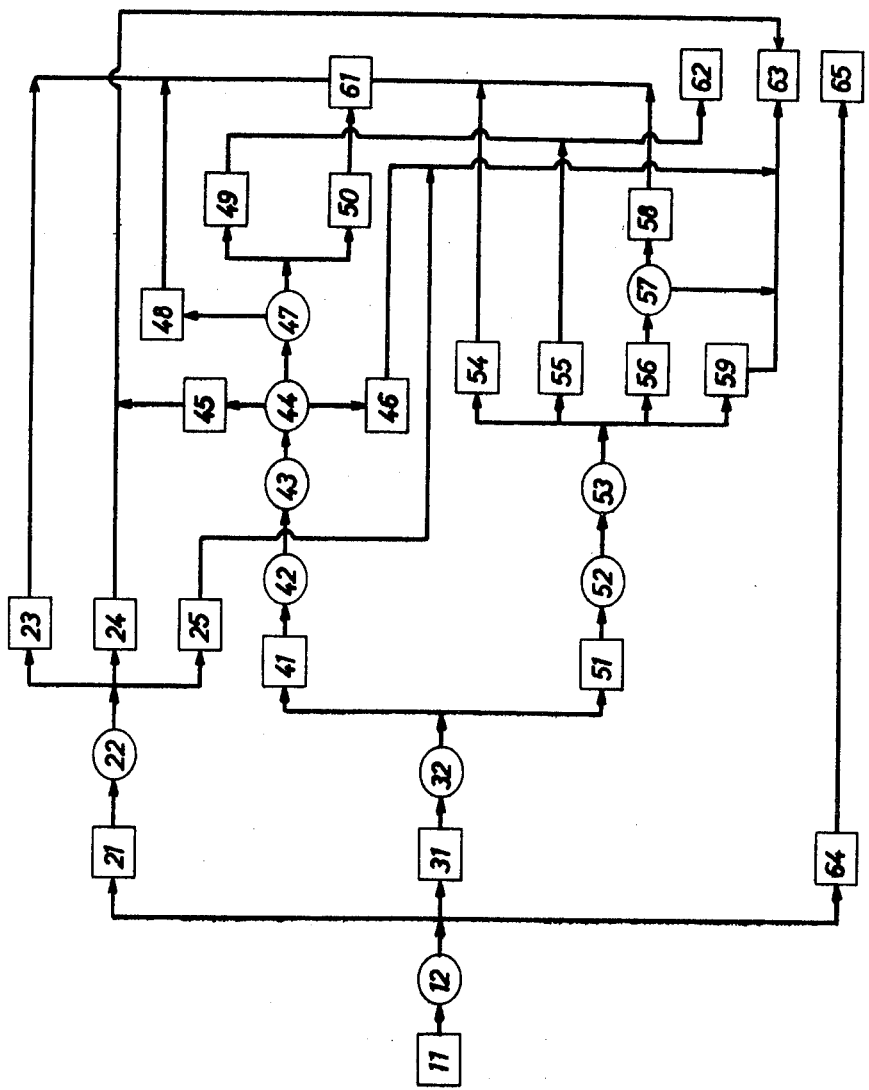

METHOD FOR PROCESSING FISHES

BACKGROUND OF THE INVENTION

1. Field of the Invention

This invention relates to a method for processing fishes for the manufacture of canned or long time storagable food stuff in connection with the fishes.

2. Prior Art of the Invention

For canning or long time storaging the food stuffs of fishes, the fishes are usually processed by having removed therefrom the head parts, the tails, the skins, the bones, the internal organs, blood, etc. and the obtained fish meats are heated to coagulate the protein components thereof and then cooled to harden the connective tissues of the fish meats.

For this purpose, heretofore the dressed fish bodies, which were prepared by cutting off the head parts and removing internal organs, have been processed by steps including juxtaposing the dressed bodies in steaming baskets, heating the dressed fish bodies in the steaming baskets by steam flow at a temperature of 100° to 104° C for 60 to 200 minutes, cooling the dressed fish bodies at room temperature for about 24 hours, slicing the dressed fish bodies into three parts, namely the upper meat part, the lower meat part and the central vertebral part which was sliced as thin as possible to contain the central vertebra to minimize the weight of the meat attached to the central vertebra, and pealing off the skins and the meats of bloody color, from the upper and lower meat parts, and the processed meat has been used as canning food stuffs. However, this process has some faults as described below:

(1) As the dressed fish bodies are spindle-shaped when they are boiled and are enveloped in their skin and fatty layer, they must be boiled for a long time at a relatively high temperature to coagulate the proteinous component thereof, with the result that a considerable quantity of heat energy and time are required for this process, fish meats near the skin are detoriated by excessive heating, yield of fish meat is considerably lowered by excessive dehydration, and moreover the temperature difference between the central part and the surface part of the dressed fish bodies differ the coagulation degree of the extract meat and proteinous component of the dressed fish bodies between the two with resultant non-uniform shrinkage in the fish meat whereby the dressed fish bodies are apt to be cracked.

(2) As the dressed fish bodies, prepared by removing the head parts and the inner organs therefrom, are substantially spindle-shaped, juxtaposition of the dressed fish bodies on steaming baskets is so unstable that some deformation of the dressed fish bodies are unavoidable and the dressed fish bodies are no longer of like form. Because of this unequal form of the dressed fish bodies, the process following the heating process of the dressed fish bodies cannot be mechanized or automized and one must rely upon manual labors.

(3) As described in the foregoings, the dressed fish bodies of spindle-shaped form need considerable time for cooling them as well as for the process of heating and accordingly the fish bodies must be exposed to the atmosphere for a long time with the result that the surfaces thereof are apt to be oxidized and/or over dried and they are in some seasons in danger of contamination.

SUMMARY OF THE INVENTION

It is an object of the present invention to provide a method for processing fishes within a short time and with a small amount of heat energy to obtain fish meat of uniform quality. It is another object of the present invention to provide a method for processing fishes from which the obtained dressed fish bodies are resistant to both oxidation or dehydration on their surfaces and contamination thereof.

It is still another object of the present invention to provide a method for processing fishes from which the obtained dressed fish bodies are neither distorted nor cracked.

Now the present invention will be hereinafter described in detail in conjunction with the drawing which shows a flowchart of a method for processing fishes according to one embodiment of the present invention.

In the drawing, numeral 11 designates fishes to be processed such as tunas, bonitos or mackerals which are rinsed after their landing, or defrosted after being frozen; Numeral 12 designates a step of dividing the fishes into head parts 21, internal organs 64 and dressed fish bodies 31 of spindle-shaped form.

The head parts 21 of the fishes are conveyed by means of "brancher" machine to the place where they are heated to a predetermined temperature and then they are forcibly cooled and divided into head part meats 23, cheek meats 24 and head waste 25. The cheek meats 24 as well as the head waste 25 are used as fertilizers 63 and the head part meats 23 are used as edible meats 61 called loin cut.

The aforementioned dressed fish bodies, which are prepared by removing the head part 21 and the internal organs 64 from the fishes, are sliced into the vertebral parts including the spines and the other major bones and the upper and lower meat parts or fillets by means of a conventional fillet machine 32. The upper and lower meat parts, also called fillets 41, are heated at 42 continuously or discontinuously by any suitable means to the required temperature.

In this case, the fillets are juxtaposed on thermally conductive solid plates, such as steel plates, in such a manner that the surface skins thereof are in contact with the plates and the meat parts are placed with their faces upwardly.

After the fillets are heated, they are forcibly cooled at 43 and the skins thereof are peeled off therefrom at 44. The peeled skins and pectoral fin meats are also used as fertilizers 63. After removal of the skins, the scales 46 and the pectoral fin meats 45 from the fillets, they are rinsed after removing the meats of bloody color 49 and the belly meats 48 therefrom to thereby obtain loins 50, which are cut into several pieces to provide loin cuts 61 for canned goods. The belly meats 48 obtained by the beforementioned step are also used as loin cuts 61 and the meats of bloody color 49 are used as foods 62 for pets.

On the other hand, the vertebral parts obtained by each cutting dressed fish body into three pieces by the filleting machine 32 are heated at 52 to coagulate the extract meat and proteinous component of the vertebral part and then are forcibly cooled at 53. The white meats 54 adhering to these vertebral parts are demounted therefrom and are used as fillers for the loin cuts 61. Red meats 55 are also demounted from the vertebral parts and are used as pet foods 62.

The vertebral parts, from which the red meats 55 and the white meats 54 are removed and further white meats 58 attached to the inner part of the dorsal sting 56 are demounted, and a suitable quantity of water is charged into a container provided with a stirrer and the resultant mix is mixed well to thereby separate and take out white meats 58 attached to the inner part of the dorsal sting 56 therefrom, which white meats 58 are also used as fillers for the loin cuts 61. The obtained residual bones are also used as fertilizers 63 together with other bones 59.

The internal organs as well as the head part removed from the fish are used for making a soluble protein 65.

Fish which are usable for the present invention are tunas, bonito, mackeral and the like, as mentioned above.

The heating temperature of the fillet 41 in the step 42, depending on the kind of fish, must be sufficient to heat the fish bodies to 60° C, because the extract meats of the fillets consist of mainly myosin, which coagulates at 45° to 50° C, and myogen, which coagulates to 60° C. In the interest of efficiency, it is preferable in heating the fillet to keep them in hot water at a temperature of 80°-100° C or in a flow of steam for about 20 to 30 minutes.

The fillets 41 which were subjected to step 42 and preferably cooled by forcibly immersing them into cold water, or blocks of ice or by contacting them with a stream of coolant such cooled air, water or water spray 43 as opposed to cooling them at room temperature. According to the present invention, as the dressed fish bodies, obtained by removing the head parts and internal organs of the fishes therefrom, are sliced into three parts, namely, the central vertebral parts which are cut off from the dressed fish bodies in a manner to minimize the fish meat attached thereto and the upper and lower meat parts, and the resultant upper and lower meat parts are juxtaposed on a plate of steel and the like, and heated thereon, thickness of the bodies to be heated is reduced to about one third as compared with that of the bodies to be heated in conventional methods.

According to the present invention the bodies to be heated are moreover heated by hot water or steam with the result that heating time is reduced to about one fifth as compared with that required for conventional methods. Accordingly, the heat energy required for the present invention is cut down, obtained meats are not detoriated and yield of the obtained meats is increased.

Also, according to the present invention, as the fillets are cooled forcibly by immersing them into cold water or blocks of ice or contacting them with a stream of coolant such as water, air, or water spray after they are heated and thickness of the fillets is reduced to about one-third comparing with that of the fish bodies, time required for cooling the heated fish bodies takes only about twenty minutes and work efficiency of the present invention is much increased.

Moreover, according to the present invention, time required for heating the fish bodies is so much reduced that the hydration ratio of the resulted fish meats is reduced to about one half as compared with that of conventional methods and yield of the obtained product is much increased.

Regarding cooling heated fishes, the conventional methods take it about 24 hours to cool them and accordingly the processed fish meats have been oxidized and/or deteriorated.

On the contrary, the present invention takes about only 20 minutes and then there is no possibility of there occurring such quality degradation of the obtained fish meats.

In the conventional methods, the surfaces of the skins of the fish bodies are in contact with the atmosphere for a long time with the result that the skins are dried and stuck to the meats, and when the skins are peeled off, some fish meats are also peeled off with the skins.

According to the present invention, as the dressed fish bodies are sliced into three thin parts and the obtained thin upper and lower fillets are heated on a plain plate of steel with their skin downwardly thereon, the skin surface after the heating procedure are flat and the fish fillets have moderate moisture with the result that peeling off the skins of the fillets can be done in a short time without peeling off some meats with the skins. Moreover, as the fish fillets are substantially uniform flat shaped, the process for peeling off the skins from the fish fillets and the process for removing the meats of bloody color may be mechanized. Even when both processes are carried out by manual labor, work efficiency can be increased.

Furthermore, according to the present invention, bones to which small pieces of white meats are attached and which are discharged from food processing in connection with fish bodies, mainly bones adhering with white meats in the dorsal sting, and a suitable quantity of water are charged into a container provided with a stirrer and the resultant mixture is mixed well to thereby separate the white meats from the bones and collect them, these small white meats, which have been used only as fertilizers owing to the fact that they could not be separated from the bones, are recovered. Accordingly, these white meats are not only easily removed from the bones but also used as food stuffs of same value as loin cuts, which is better than being converted into fertilizers.

Accordingly yield of fish meats for the present invention is much increased.

PREFERRED EMBODIMENTS OF THE INVENTION

Example 1

A head part and internal organs of a bonito weighing 3.890 g were removed therefrom to thereby obtain the dressed fish body of the bonito which was sliced into three parts including the central vertebral part, and the upper and lower fillet parts. The upper and lower fillet parts were juxtaposed on a stainless steel plate with the skins of the fillets facing downwardly making their skins contact with the stainless steel plate and they were boiled in water at 95° C for about 25 minutes. The fillets were then cooled in a water stream of 18° C for about 20 minutes.

The skins of the transacted fillets were peeled off by a knife. Further the fillets were longitudinally divided into two parts to form dorsal and abdominal fillets and then the meats of bloody color were removed therefrom to obtain loin cuts.

After each step was carried out, the obtained by-products were weighed. The obtained results are shown in Table 1.

Example 2

A bonito weighing 3883 g was processed according to the same method as that described in Example 1. The obtained upper and lower fillets were peeled off their skin therefrom by means of an electric planner type peeling machine and further were longitudinally divided into two parts to form dorsal and abdominal fillets. The meats of bloody color exposed to the surfaces of the divided two parts of fillets were removed by means of rotating blades and knives which were linked by cam means preset in accordance with the step to be carried out, the obtained products were weighed.

The obtained results are shown in Table 1.

TABLE 1.

(unit gram)

|     | weight | Example 1 Manual Operation | Example 2 Mechanical Operation |
| --- | --- | --- | --- |
| (a) | Raw material fish | 3890 | 3883 |
| (b) | Head part | 434 | 466 |
| (c) | Internal organs | 336 | 333 |
| (d) | Upper-and lower fillets | 2846 | 2793 |
| (e) | Upper-and lower fillets after heating and cooling steps | 2555 | 2508 |
| (f) | Upper-and lower fillets after their skins peeled off | 2230 | 2161 |
| (g) | Upper-and lower fillets after meats of bloody color removed | 1784 | 1726 |
| (h) | Vertebra part with meat | 274 | 291 |
| (i) | Vertebra part after boiling and cooling | 210 | 222 |
| (j) | Vertebra part after removing bones | 58 | 63 |
| (k) | Extract meat (g + j) | 1842 | 1789 |
| (l) | Meat of bloody color (f − g) | 446 | 435 |
| (m) | Edible meat | 2288 | 2224 |
|     | Rate of extract meat to Raw fish (k/a 100) | 47.4% | 46.1% |
|     | Rate of edible meat to Raw fish (m/a 100) | 58.8% | 57.3% |

Regarding the workability of both examples, time required until the cooling step was finished, was about 50 minutes and the process including the step of collecting the extract meat were finished within 60 minutes.

According to this process, as the surface of the skins was plain in form and the layer consisting of gelatineous and fatty substrates under the skins built up a soft gel layer, the whole skin was peeled off from the fillets as if it slid down from the meat surface.

Referring to the step of removing the meats of bloody color from the fillets, as the substances to be treated according to this process had a definite form, it could be readily carried out even by manual operation. By mechanical operation, it was completed with a mere few adjusting operation. From these results of testing, it was recognized that time required for peeling off the skins and for removing the meats of bloody color by manual operation according to this process was shortened by 20–30% of that for conventional methods and by mechanical operation it was shortened by 70–80%.

Example 3

After a bonito weighing 3772 g was processed according to the same procedure as that described in Example 1, the obtained dressed fish body was sliced into three parts. The upper and lower fillets, two of the three parts, were juxtaposed on a plain plate of stainless steel with their skins downwardly directed making their skins contact with the stainless steel plate and they were boiled in steam of 100° C.

Then the heated fillets were cooled according to the same procedure as that described in Example 1 and then were subjected to the procedure of peeling off their skins by manual labor. The products and by-products were weighed after every procedure was over and the obtained results are shown in Table 2.

TABLE 2

|  | Weight (gram) |
| --- | --- |
| Raw material fish | 3772 |
| Head part | 443 |
| Internal organs | 337 |
| Extract meat | 1775 |
| Meat of Bloody color | 432 |
| Edible meat | 2207 |
| Rate of extact meat to raw fish meat 100 | 47.1% |
| Rate of edible meat to raw fish meat 100 | 58.5% |

As apparent from Table 2, it was recognized that the step of heating fillets by means of steam flow resulted in a rate of extract meat or edible meat to raw material fish almost equal to that obtained by the step for heating fillets by means of hot water in Examiner 1-2 and the former did not differ from the latter in connection with workability and the like.

Comparative Test 1

A head part and internal organs of bonito weighing 3738 g were removed therefrom. The obtained dressed fish body was placed in a steaming basket which was introduced into a steaming oven. Then the dressed fish body was boiled in steam of 100° C for 90 minutes and was cooled for 20 hours at room temperature naturally after it was taken out of the steaming oven.

Further, by manual labor the cooled dressed fish body was sliced into three parts including upper and lower fillets and the central vertebral part. Then the skins of the upper and lower fillets were peeled therefrom by a knife. Next, the fillets, with the skins peeled off, were longitudinally divided into two parts in the form of dorsal and abdominal fillets. Meats of bloody color were then removed therefrom by a knife.

In this process, it took 24 hours from the beginning to the end of the step of cooling. It was recognized that this process of comparative test 1 required much manual labor for dividing the dressed fish body into the three parts including the upper and lower fillets and the vertebral part, and it is difficult to peel off the skins from the fillets and to mechanize the process for peeling the skins, because the skins were dried whereby adhesive strength of gelatineous component in the fillets was increased with the result that the skins stuck to the surface of the fillets and the surface of the fillets was humped.

It was also recognized that for removing the meats of bloody color by this process of comparative test 1, there existed some possibility of peeling off the extract meats together with the meats of bloody color because the shapes of the fillets were various and accordingly mechanization of the step for removing the meats of bloody color was difficult.

Comparison was made among Examiners 1-3 and comparative test 1 in connection with rate of edible meat to raw fish. The obtained results are shown in Table 3.

TABLE 3.

|  | Ex. 1. | Ex. 2. | Ex. 3. | Comparative test 1. |
|---|---|---|---|---|
| Raw material fish | 3890 | 3883 | 3772 | 3738 |
| Head part | 434 | 466 | 443 | 470 |
| Internal organs | 336 | 333 | 337 | 325 |
| Extract meat | 1842 | 1789 | 1775 | 1345 |
| Meat of bloody color | 446 | 435 | 432 | 453 |
| Edible meat | 2288 | 2224 | 2207 | 1798 |
| Rate of Extract meat to raw fish material 100 | 47.4% | 46.1% | 47.1% | 36.0% |
| Rate of edible meat to raw material 100 | 58.8% | 57.3% | 58.5% | 48.1% |

From Table 3 it is apparent that the process according to the present invention not only improved the operability of the method for processing fishes but also increased yield of fish meat by 10% over that of conventional methods.

Example 4

1000 g of dorsal sting and about 15 kg of water were introduced into a cylindrical water tank which was provided with the rotator at the bottom of the tank. By rotating the rotor, eddy current water flow was produced in the tank. The bone component of the resultant mixture remained in the bottom of the tank and pieces of meat were diverted to the upper part of the tank by the eddy current water flow and then were easily separated from the resultant mixture.

After dewatering, 647 g of pieces of meat was obtained.

Example 5

500 g of dorsal sting and 500 g of meats adhered to bones of head parts and abdomen parts of bonitos were mixed with about 15 kg of water.

The resultant mixture was processed according to the same method as that described in Example 4 to recovery 700 g of pieces of meat.

Recoverable white meat from dorsal sting was only about 0.2-0.3% by weight of raw material fish.

However, in the standard sized factory having capacity of processing 20 tons of fish per day, quantity of recoverable meats may reach about 50 kg which is equivalent to more than 300 cans of meat of standard size.

Further, when using a recovery process as described in Example 5, recoverable quantity of meat may reach several times more than that obtained from the dorsal sting.

It may be easily understood that the present invention may bring more advantages than expected by this procedure.

The embodiments of the invention in which an exclusive property or privilege is claimed are defined as follows:

1. A method for processing a fish body which comprises the steps of:
    (a) separating the head parts and the internal organs therefrom to obtain a dressed fish body,
    (b) slicing the dressed fish body longitudinally to separate the dressed fish body into three parts comprising upper and lower fish meat fillets and a central part containing vertebra,
    (c) heating the fillets by juxtaposing them on a plain plate with their skins lowermost and in contact with the underlying plate and then subjecting the so positioned fillets to a flow of steam or to hot water at a temperature of 80°-100° C. for 20-30 minutes,
    (d) forcibly cooling the resultant fillets heated by step (c).

2. A method for processing a fish body according to claim 1, in which the forcible cooling of the fillets is carried out by contacting the fillets with a coolant of the class including water, ice, cooled gas and spray water.

3. A method for processing a fish body according to claim 1 with the added steps of:
    (e) peeling off the skins of the fillets obtained by the step (d) and removing pectoral fin meat and squamas therefrom, and
    (f) dividing the fillets into two parts and separating belly meats and meats of bloody color therefrom to obtain loin cuts.

4. A method for processing a fish body which comprises the steps of:
    (a) separating head parts and internal organs of the fish body therefrom to obtain a dressed fish body,
    (b) slicing the dressed fish body longitudinally to divide the fish body into three parts including a central part containing vertebra and fish fillets on both sides of said central part,
    (c) heating the central part containing the vertebra in a flow of steam or in hot water at a temperature of 80°-100° C. for 20-30 minutes,
    (d) forcibly cooling the central part heated by step (c),
    (e) separating from the central part bones to which white meats are adhering, and
    (f) stirring a mixture of the bones having white meats adhering thereto separated by step (e) and water to remove the white meat from the bones and then collecting the removed white meat.

5. The method of claim 4 wherein said separated bones include inner parts of a dorsal sting.

6. The method of claim 4 wherein the heating of step (c) is boiling.

* * * * *